O. A. MYGATT.
GLASS GLOBE AND REFLECTOR.
APPLICATION FILED JUNE 5, 1908.
1,111,400.
Patented Sept. 22, 1914.
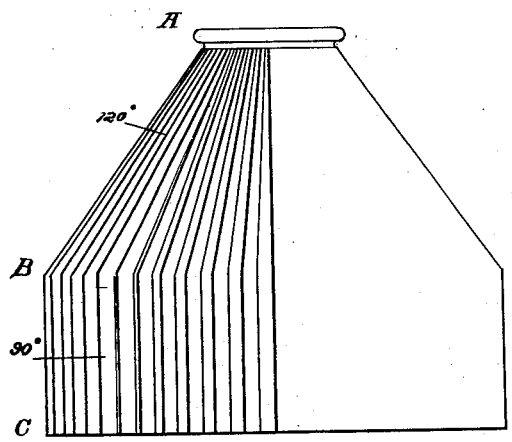
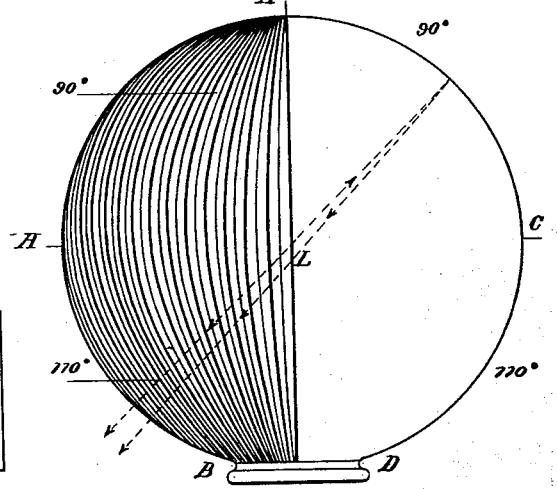
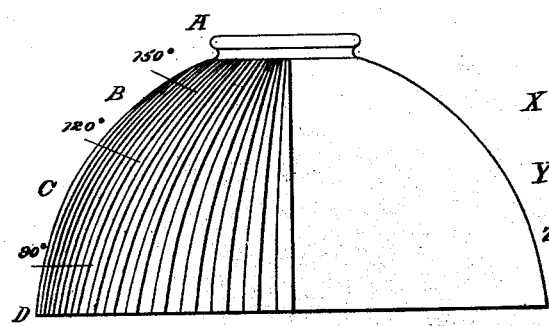
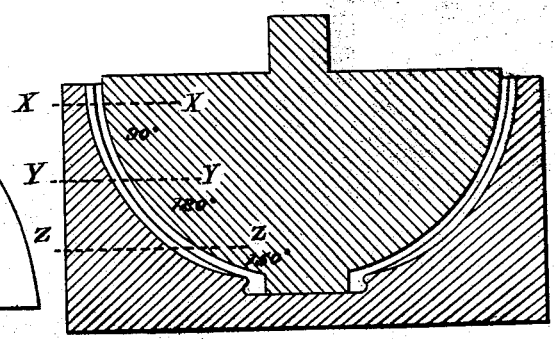
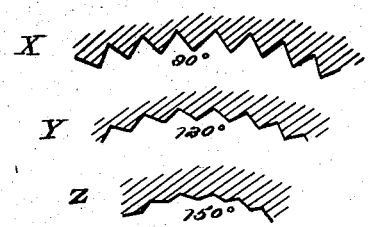
WITNESSES
INVENTOR
BY
ATTORNEYS

UNITED STATES PATENT OFFICE.

OTIS A. MYGATT, OF NEW YORK, N. Y.

GLASS GLOBE AND REFLECTOR.

1,111,400.      Specification of Letters Patent.      Patented Sept. 22, 1914.

Application filed June 5, 1908. Serial No. 436,868.

*To all whom it may concern:*

Be it known that I, OTIS A. MYGATT, a citizen of the United States, residing at New York, in the county of New York and State of New York, have invented certain new and useful Improvements in Glass Globes and Reflectors, of which the following is a specification, reference being had therein to the accompanying drawing.

The object of the invention is to provide prism glass, globes, shades and reflectors having their outer surfaces practically covered with radial ribs, so that such shades will appear over most of their surface composed of the same medium, while different parts of their surface will act differently on light rays.

All prism glass shades so far constructed have been of two types: The first type are homogeneous in appearance, practically their entire surface being covered with substantially radial prisms. In the second type, the prisms are varied in appearance, being either partly radial and partly horizontal, or else radial and interrupted, as in my Patent No. 821,306, of May 22, 1906. The first type, that is prism glass shades depending on radial prisms for their light directing qualities have always been made from molds having prisms cut from top to bottom with a similar cutting tool; that is to say, producing in glassware, prisms of the same angle from top to bottom. Naturally such prisms had the same mechanical power over rays of light at any part of their length,—a 90 degree prism being a 90 degree prism from top to bottom, and an 80 degree prism being an 80 degree prism from top to bottom: Each part of the prism therefore is of the same mechanical reflecting power or light directing power, and a shade made of a definite shape would necessarily have to give a definite light distributing result.

Experience in making hundreds of thousands of prismatic shades has shown me that a homogeneous shade of the proper shape, that is a shade having substantially radial prisms from top to bottom, is the one that pleases most by its appearance; nevertheless, the limitation in light distributing power of such shades have been a great drawback. I attempted to overcome this in a shade of the second type mentioned, exemplified in my Patent No. 821,306, but at the cost of destroying the general evenness or homogeneousness of the appearance of the reflector. In that Patent I disclose interrupted reflecting prisms which allow the light to pass through and out of the reflector, and so modify its reflecting light distributing power. Reflectors made under my Patent No. 821,306 are in practice very efficient from a scientific standpoint, because by means of this invention a reflector made of definite shape can be made to give many different light distributions by mutilating or interrupting the prisms, to permit the light to pass through and out. In practice, however, they have often failed to satisfy decorative tastes because they are not homogeneous in appearance, the interruption or mutilation of the radial prisms always producing a design; so that although the distribution of light may be satisfactory, the appearance of the reflector is not necessarily so.

My present invention is intended to give to prism glass shades and reflectors having substantially radial prisms on their surface all the flexibility of light distribution given by my Patent No. 821,306, without altering the general appearance of the reflector. It is a well known fact that a shade or reflector having on its outer surface substantially radial prisms of about 90 degrees will reflect back most of the rays of light striking the surface. If the angle of these prisms should be altered, its quality as a good reflector diminishes until somewhere between 100 and 110 degrees, it ceases to have any reflecting power whatever and becomes simply a prism which transmits or directs light to the eye. However, a radial prism on a glass shade looks practically the same, whether it is 90, 100 or even 110 degrees. I make use of this fact to produce reflectors of homogeneous appearance, which are apparently substantially covered from top to bottom with substantially similar radial prisms; yet by making the molds in such a way that the angle of this prism is changed in different parts of its length, I am enabled to produce shades and reflectors of exactly the same size, shape and appearance, which have totally different light distributing curves or light distributing power. For instance, two deep shaped reflectors can be made exactly similar in size, shape and general appearance, with exactly the same types of light source placed inside and in exactly the same position, and still one reflector manufactured under this present application will give a concentrating curve of reflection, while the other will give a so-called bat's wing curve of distribution.

Figure 1 is a side elevation of a shade embodying my invention, a part of the shade only being shown covered with prisms as a matter of convenience; Fig. 2 is another elevation of a globe embodying the invention. Fig. 3 is an elevation of another form of shade embodying the invention. Fig. 4 is a vertical cross-section of a mold and plunger indicating the variations of the cutting angles. Fig. 5 is a series of cross-sections showing the prism angles of Fig. 4.

In Fig. 1 the upper prisms from A to B are here shown as 120 degrees for transmission, while the lower prisms from B to C are shown as 90 degrees for reflection. The transmission may be gradual if desired. This is of course all carried out in an integral prism, which is apparently homogeneous.

In Fig. 2, the light rays sent from the light source to the 90 degree prisms, in this instance at the top of the globe, are totally reflected by these prisms and then transmitted through the transmitting prisms of 110. The prisms have an integral homogeneous appearance never achieved by any known type of globe, in conjunction with the various functions which are set forth in this invention.

In Fig. 5 at $x$—$x$ the angles are shown as 90 degrees, at $y$—$y$ they are shown as 120 degrees and at $z$—$z$ they are shown as 150 degrees.

For producing commercial reflectors similar in appearance, size and shape, my invention is most important in enabling me absolutely to control the light distributing curves given by almost any size and shape of reflector without changing its appearance. Very often in a large room different lighting means used in different parts will need different curves of light distribution; yet for uniformity all such reflectors should be of the same size, shape and appearance from a decorative standpoint. Hitherto where reflectors were made of the same reflecting medium, and of the same size, shape and appearance they have always given the same curve of light distribution. It is only by my present invention that two prismatic reflectors identical in appearance, size, shape and type can be made which will give two totally different curves of light distribution. I accomplish this by altering the angle of the prisms used on my shade in different parts of their lengths, so that although the reflector appears homogeneous over its entire surface, being apparently substantially covered with similar substantially radial prisms, nevertheless in fact it is of totally different reflecting power in different parts of its surface. Such parts are arranged at will according to the curve of light distribution required, by simply flattening out more or less the prism in different parts of its length, in order to control the total light reflected from different areas of the shade or reflector. A difference of less than 20 degrees in the angle of a radial prism on a shade will change it from reflecting back over 80% of the light to transmitting over 80% of the light.

Having described my invention, what I claim is:

Transparent glass shades having substantially radial prisms running practically from top to bottom of the shade, the angle of each of said prisms gradually varying in definite parts of its length so as to allow light reflection from definite parts of its length and light transmission through other definite parts of its length.

OTIS A. MYGATT.

Witnesses:
W. A. DORSEY,
JOEL B. LIBERMAN.